UNITED STATES PATENT OFFICE.

HERBERT H. DOW AND EDWIN O. BARSTOW, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING MAGNESIUM CHLORID.

1,336,425.  Specification of Letters Patent.  Patented Apr. 13, 1920.

No Drawing.   Application filed June 25, 1918.  Serial No. 241,759.

*To all whom it may concern:*

Be it known that we, HERBERT H. DOW and EDWIN O. BARSTOW, citizens of the United States, and residents of Midland, county of Midland, State of Michigan, have jointly invented a new and useful Improvement in Methods of Making Magnesium Chlorid, of which the following is a specification, the principle of the invention being herein explained and the best mode in which we have contemplated applying that principle, so as to distinguish it from other inventions.

The present improved method of manufacturing magnesium chlorid may be regarded as a modification or improvement of the process which forms the subject matter of Patent No. 1,209,245 issued to Edwin O. Barstow under date of December 19th, 1916.

As in the process of such companion case, the object of the present invention is the provision of a simple and practicable process for making magnesium chlorid from natural brines, such as occur, for example, in the Michigan district, which contain sodium chlorid and calcium chlorid, in addition to such magnesium chlorid.

A further object is to utilize in such manufacture of magnesium chlorid a reagent or reagents available from other sources, and specifically sodium sulfite, or sodium sulfite and carbonate, which are by-products in the manufacture of phenol. In other words, we have discovered that the compounds just named will successfully react in the same fashion as does magnesium sulfite in precipitating calcium from a brine of the character described above.

Our invention, then, consists of the steps hereinafter fully described and particularly pointed out in the claims, the following description setting forth in detail certain steps embodying the invention, such described steps constituting, however, but one of various ways in which the principle of the invention may be used.

As just indicated, in the process described in the aforesaid patent, the calcium chlorid in the brine may be replaced with magnesium chlorid, by treating such brine with magnesium sulfite, the reaction being represented by the following formula:

$$CaCl_2 + MgSO_3 = CaSO_3 + MgCl_2.$$

We have found that sodium sulfite will react in the same fashion and equally readily, the reaction in such case being represented as follows:

$$CaCl_2 + Na_2SO_3 = CaSO_3 + 2NaCl.$$

In this case of course there will be no added increment of magnesium chlorid produced, but the amount of sodium chlorid or common salt in the solution is proportionately increased.

After filtering off the calcium sulfite precipitate produced by the foregoing reaction, a solution of sodium and magnesium chlorids is accordingly left. Where it is desired to use the magnesium chlorid as such, it is recovered from this solution by evaporating the same until the sodium chlorid separates out, which takes place at a gravity of about 34° Baumé. The mother liquor, containing the magnesium chlorid, is then evaporated until it corresponds in composition to the chlorid with water of crystallization ($MgCl_2.6H_2O$), when it is drawn off into drums and allowed to cool and solidify. Should it, on the other hand, be desired to obtain the magnesium in the form of a salt, for example, the carbonate, which is insoluble in the combined solution, such solution may be treated with sodium carbonate which precipitates the magnesium as magnesium carbonate. The latter may then be readily separated from the residual sodium chlorid solution by well understood methods.

Inasmuch as sodium carbonate may be found admixed with sodium sulfite where the latter is taken as a by-product from the manufacture of phenol, we have determined by actual test that the two compounds in question may be successfully used together in treating the brine, the reaction that occurs in such case between the calcium chlorid and sodium carbonate being represented by the following formula:

$$CaCl_2 + Na_2CO_3 = CaCO_3 + 2NaCl.$$

The calcium carbonate of course forms a precipitate, just as does the calcium sulfite that is simultaneously formed, where a mixture of sodium sulfite and carbonate is employed, and such precipitate is filtered off and the process otherwise conducted just as before, with a view to recovering the desired magnesium chlorid.

Other modes of applying the principle of our invention may be employed instead of the one explained, change being made as regards the process herein disclosed, provided the step or steps stated by any one of the following claims or the equivalent of such stated step or steps be employed.

We therefore particularly point out and distinctly claim as our invention:—

1. In a method of making magnesium chlorid from a brine containing sodium chlorid and calcium chlorid in addition to magnesium chlorid, the steps which consist in treating such brine with sodium sulfite, whereby the calcium chlorid therein is precipitated as calcium sulfite, leaving a solution of sodium and magnesium chlorids; and then separating such last named chlorids, substantially as described.

2. In a method of making magnesium chlorid from a brine containing sodium chlorid and calcium chlorid in addition to magnesium chlorid, the steps which consist in treating such brine with sodium sulfite, whereby the calcium chlorid therein is precipitated as calcium sulfite, leaving a solution of sodium and magnesium chlorids; evaporating such solution to a point where the sodium chlorid separates out; and then separating such crystallized sodium chlorid, leaving the magnesium chlorid in solution.

3. In a method of making magnesium chlorid from a brine also containing calcium chlorid; the step which consists in treating such brine with sodium sulfite, whereby such calcium chlorid is precipitated as calcium sulfite.

4. In a method of making magnesium chlorid from a brine containing sodium chlorid and calcium chlorid in addition to magnesium chlorid, the steps which consist in treating such brine with sodium sulfite and carbonate, whereby the calcium chlorid therein is precipitated as calcium sulfite and carbonate, leaving a solution of sodium and magnesium chlorids; and then separating such last named chlorids, substantially as described.

5. In a method of making magnesium chlorid from a brine containing sodium chlorid and calcium chlorid in addition to magnesium chlorid, the steps which consist in treating such brine with sodium sulfite and carbonate, whereby the calcium chlorid therein is precipitated as calcium sulfite and carbonate, leaving a solution of sodium and magnesium chlorids; and then evaporating such solution to a point where the sodium chlorid separates out; and then separating such crystallized sodium chlorid, leaving the magnesium chlorid in solution.

6. In a method of making magnesium chlorid from a brine also containing calcium chlorid, the step which consists in treating such brine with sodium sulfite and carbonate, whereby such calcium chlorid is precipitated as calcium sulfite and carbonate.

Signed by us, this 20th day of June, 1918.

HERBERT H. DOW.
EDWIN O. BARSTOW.